United States Patent
Kitamura et al.

(10) Patent No.: US 10,180,739 B2
(45) Date of Patent: Jan. 15, 2019

(54) INPUT DEVICE FOR A PORTABLE ELECTRONIC APPARATUS

(71) Applicant: LENOVO (SINGAPORE) PTE. LTD., Singapore (SG)

(72) Inventors: Masahiro Kitamura, Kanagawa-ken (JP); Mitsuo Horiuchi, Kanagawa-ken (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 0 days.

(21) Appl. No.: 15/206,024

(22) Filed: Jul. 8, 2016

(65) Prior Publication Data
US 2017/0024029 A1 Jan. 26, 2017

(30) Foreign Application Priority Data
Jul. 10, 2015 (JP) .................. 2015-138621

(51) Int. Cl.
*G06F 3/02* (2006.01)
*G06F 3/0354* (2013.01)
*G06F 1/16* (2006.01)
*G06F 3/0338* (2013.01)

(52) U.S. Cl.
CPC .......... *G06F 3/03547* (2013.01); *G06F 1/169* (2013.01); *G06F 1/1656* (2013.01); *G06F 1/1662* (2013.01); *G06F 3/0338* (2013.01)

(58) Field of Classification Search
CPC combination set(s) only.
See application file for complete search history.

(56) References Cited

U.S. PATENT DOCUMENTS

| 2003/0221943 A1* | 12/2003 | Masuda | H01H 13/48 200/406 |
| 2009/0279238 A1* | 11/2009 | Kobayashi | G06F 1/1616 361/679.09 |
| 2010/0079404 A1* | 4/2010 | Degner | G06F 3/03547 345/174 |
| 2012/0134109 A1* | 5/2012 | Takahashi | G06F 1/1684 361/679.55 |
| 2012/0182236 A1* | 7/2012 | Tsai | G06F 1/169 345/173 |
| 2013/0050099 A1* | 2/2013 | Hirano | G06F 1/169 345/173 |

FOREIGN PATENT DOCUMENTS

| JP | 200822610 A | 9/2008 |
| JP | 2012-123849 A | 6/2012 |
| JP | 2013-025422 A | 2/2013 |
| WO | 2014178220 A1 | 11/2014 |

* cited by examiner

*Primary Examiner* — Kwin Xie
*Assistant Examiner* — Sosina Abebe
(74) *Attorney, Agent, or Firm* — Anthony P. Ng; Russell Ng PLLC

(57) ABSTRACT

An input device having sufficient countermeasure against static electricity is disclosed. The input device includes a touch pad as an operation-input part that is movably supported above a metal base plate. The operation-input part includes a pad plate to receive an input operation, a board plate stacked below the pad plate to detect an input operation to the pad plate, and a resin housing plate stacked below the board plate. The base plate has an upper face, on which a protruding piece is disposed so as to be inserted between the board plate and the housing plate and come into contact with a ground line as a conductive part provided at the board plate.

8 Claims, 6 Drawing Sheets

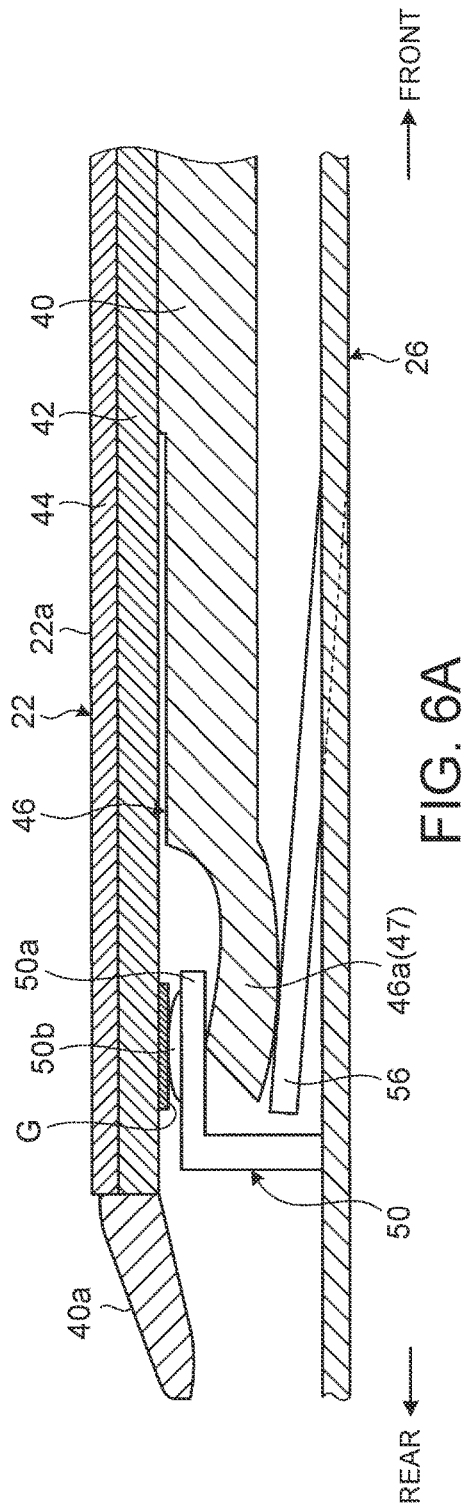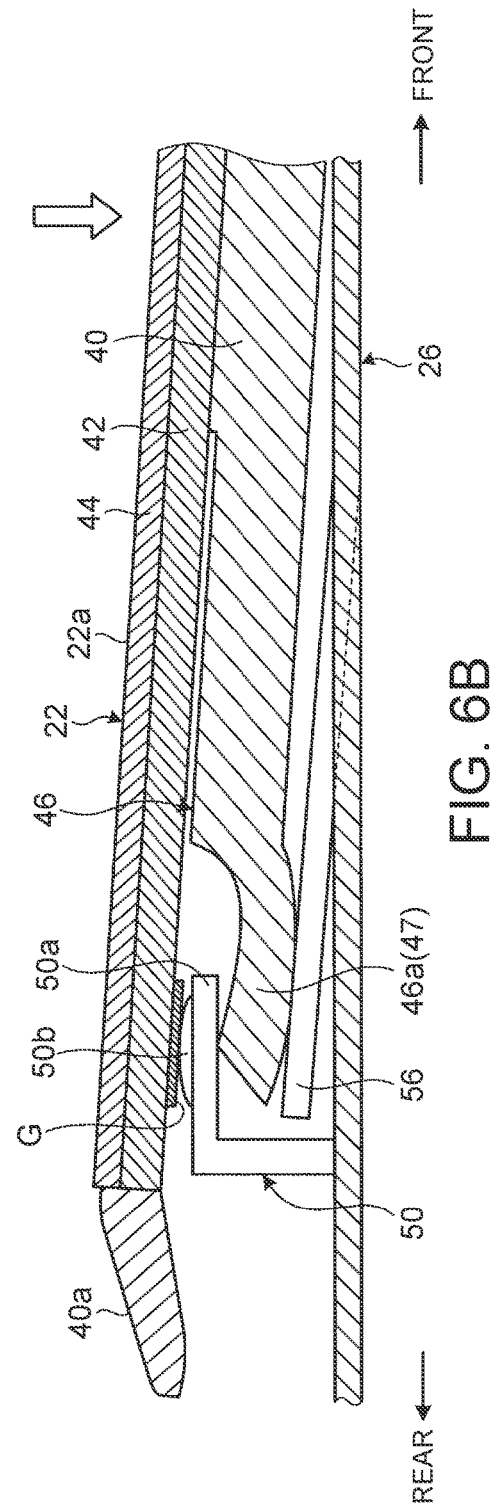
FIG. 6A
FIG. 6B

INPUT DEVICE FOR A PORTABLE ELECTRONIC APPARATUS

PRIORITY CLAIM

The present application claims benefit of priority under 35 U.S.C. §§ 120, 365 to the previously filed Japanese Patent Application No. JP2015-138621 with a priority date of Jul. 10, 2015, which is incorporated by reference herein.

BACKGROUND OF THE INVENTION

1. Technical Field

The present invention relates to input devices in general, and particularly to an input device having an operation-input part to receive an input operation that is movably supported above a base plate.

2. Description of Related Art

In addition to a keyboard, a laptop personal computer (laptop PC) is typically provided with various input devices, such as a touch pad and a pointing device, as an alternative to a mouse. A touch pad enables the manipulation of a computer displayed on a display device, in response to a touch operation thereto with a finger tip or a pen tip.

Since a touch pad includes a board to detect a touch operation, counter-measures against static electricity are required at the touch pad and the board. One method is to connect the ground line (GND) provided at the board and a metal base plate to vertically-movably support the touch pad with an earth wire. This method, however, leads to an increase in the number of components as well as in the number of steps for assembling of the components, which leads to an increase in cost.

Consequently, it would be desirable to provide an improved input device with sufficient countermeasure against static electricity while without increasing cost.

SUMMARY OF THE INVENTION

In accordance with a preferred embodiment of the present invention, an input device includes a metal base plate and an operation-input part. Movably supported above the metal base plate, the operation-input part includes a pad to receive an input operation, a board stacked below the pad to detect the input operation on the pad, and a resin housing plate stacked below the board. The metal base plate has an upper face, on which a protruding piece is disposed so as to be inserted between the board and the resin housing plate and come into contact with a conductive part provided at the board.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein:

FIGS. 6A-6B are cross-sectional side views of the touch pad and the base plate, wherein FIG. 6A shows a state where the touch pad is not being pressed, and FIG. 6B shows a state where the touch pad is being pressed.

DETAILED DESCRIPTION OF A PREFERRED EMBODIMENT

Figure 1:
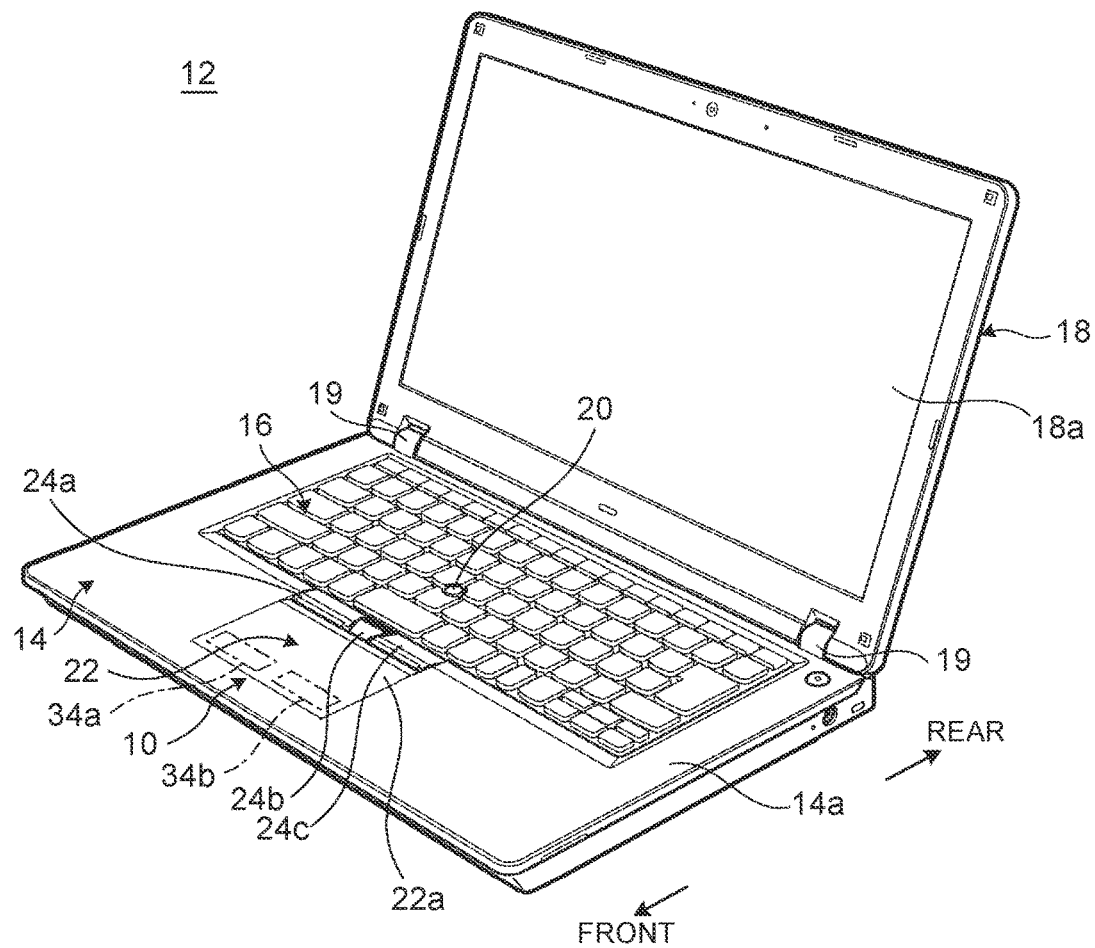
FIG. 1 is a perspective view of an electronic apparatus having an input device, in accordance with a preferred embodiment of the present invention.

Referring now to the drawings and in particular to FIG. 1, there is depicted a perspective view of an electronic apparatus 12 having an input device 10, in accordance with a preferred embodiment of the present invention. In the following descriptions, based on the usage form of the input device 10 in the electronic apparatus 12 shown in FIG. 1 as a reference, the side near an operator is called the front side (forward), the side away from the operator is called the rear side (rearward), the thickness direction of a body chassis 14 making up the electronic apparatus 12 is called the vertical direction, and the width direction thereof is called the horizontal direction.

As shown in FIG. 1, the electronic apparatus 12 is a laptop PC including the body chassis 14 having the input device 10 and a keyboard device 16, and a display chassis 18 having a display unit 18a, such as a liquid crystal display. The display chassis 18 is coupled openably/closably to the body chassis 14 via a pair of left and right hinges 19, 19.

The body chassis 14 internally stores various electronic components, such as a board, a processing unit, a hard disk device, and a memory. The input device 10 and the keyboard device 16 are placed at the front and the rear on a top face 14a of the body chassis 14, respectively. At a substantially center of the keyboard device 16, a pointing stick 20 is provided. The pointing stick 20 is to manipulate a cursor (mouse pointer) displayed on the display unit 18a, which is input means that can be manipulated instead of the mouse.

Although the present embodiment exemplifies the configuration where the input device 10 is mounted on the electronic apparatus 12 as a laptop PC as stated above, the input device 10 may be mounted on a keyboard device as a single body to be connected to a desktop PC or the like.

Figure 2:
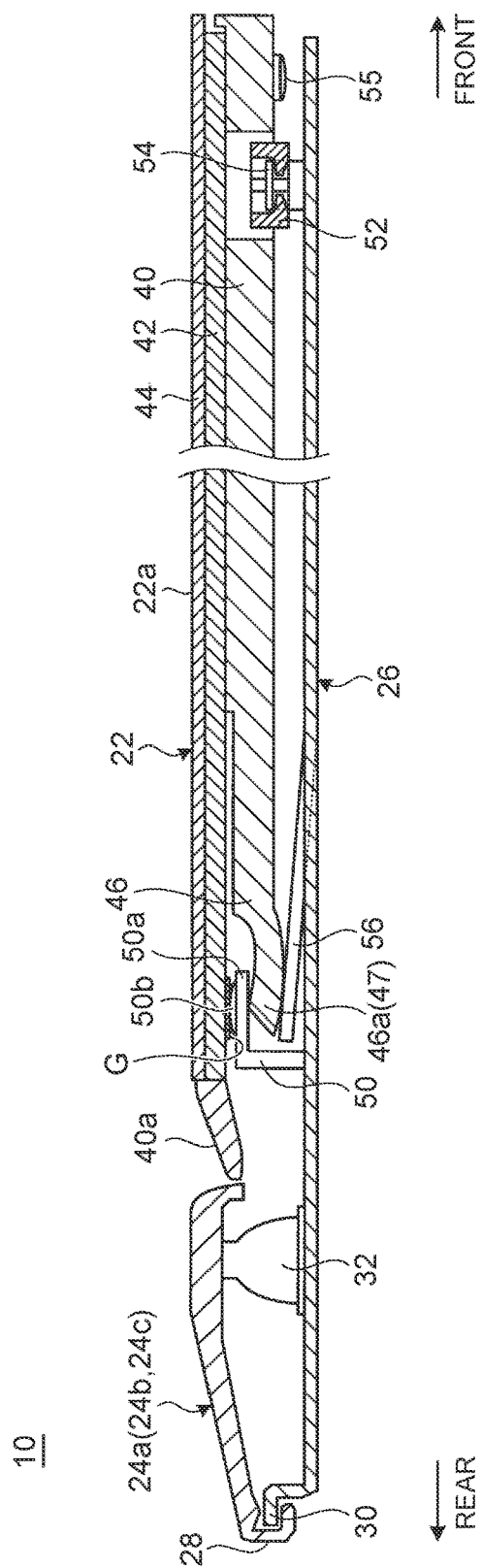
FIG. 2 is a cross-sectional side view showing the configuration of the input device, in accordance with a preferred embodiment of the present invention.
Figure 3:
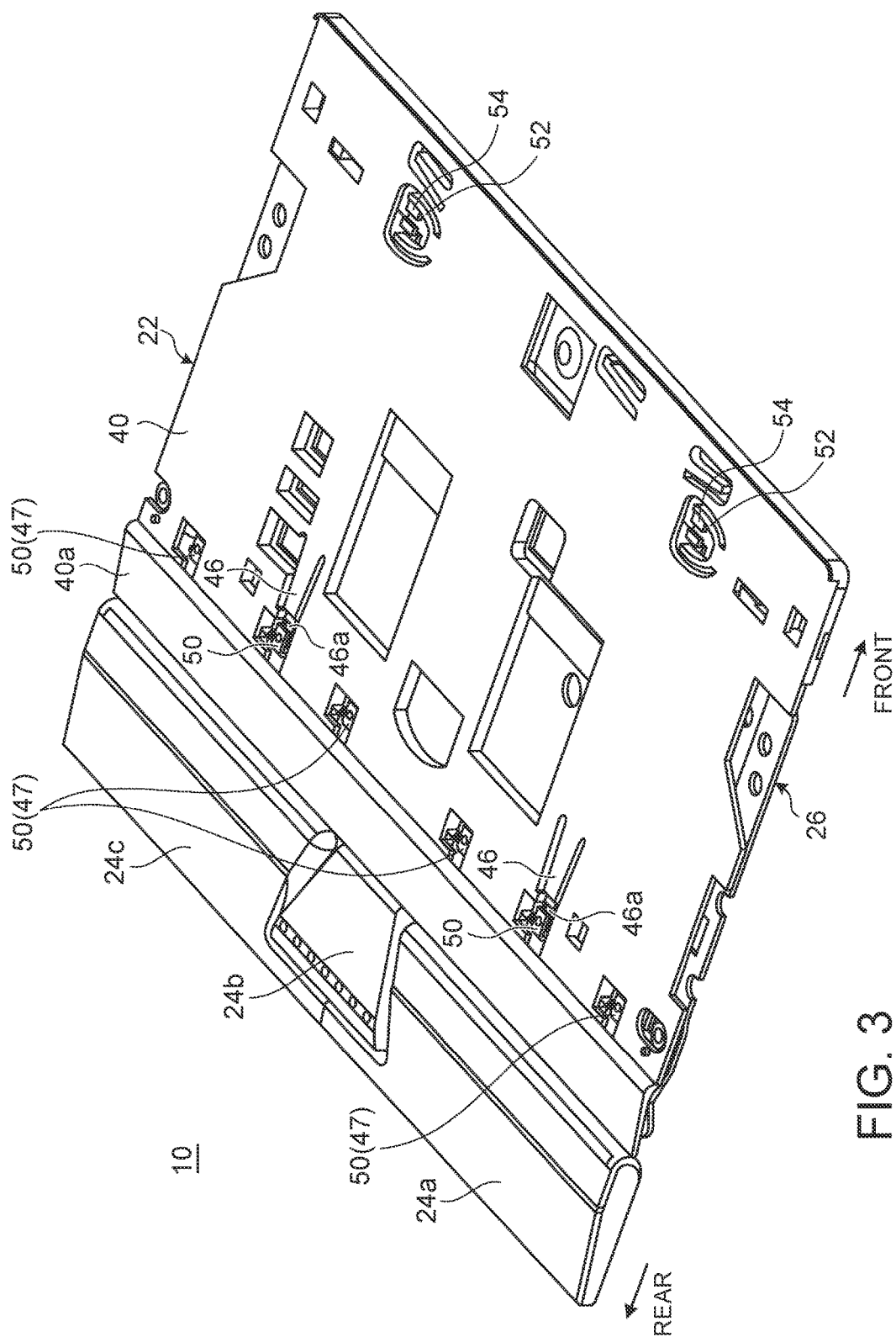
FIG. 3 is a perspective view of the input device shown in FIG. 2.

FIG. 2 is a cross-sectional side view of the input device 10, according to a preferred embodiment of the present invention, and FIG. 3 is a perspective view of the input device 10 shown in FIG. 2.

As shown in FIG. 1 and FIG. 2, the input device 10 includes a touch pad (operation-input part) 22 to receive a touch operation of an operator by bringing a fingertip or the like closer to or into contact with there, and three press buttons 24a, 24b and 24c arranged along the rear end part of the touch pad 22. As shown in FIGS. 2-3, the touch pad 22 and the press buttons 24a to 24c are supported on the side of the upper face of the base plate 26 that is a metal plate member.

Firstly, the press buttons 24a to 24c operate in relation to the cursor manipulation using the pointing stick 20 or the touch pad 22, and are click-operation buttons corresponding to a left button, a center button and a right button of a typical mouse, respectively. The press buttons 24a to 24c may be placed close to the forward end of the touch pad 22, or may be disposed with a frame of the body chassis 14 put between the touch pad 22 and the buttons.

As shown in FIG. 2, the press buttons 24a to 24c have their rear ends 28 that rotatably engage with a supporting piece 30 standing from the rear end of the base plate 26, whereby these buttons can swing about the rear-ends 28 as a supporting point. Therefore, when the front-end part of each press buttons 24a to 24c is pressed, then a rubber dome 32 placed inside is compressed, whereby a switch not illustrated, such as a membrane switch, provided on the upper face of the base plate 26 is turned on.

Next, the touch pad 22 is configured as a click pad, with which a click operation by pressing also can be performed, in addition to a touch operation.

As shown in FIG. 1, pseudo button areas 34a, 34b are configured on a part of a touch operation face 22a as the surface of the touch pad 22 that is close to the front side. The pseudo button areas 34a, 34b have their respective areas on the touch operation face 22a defined with coordinates, and are invisible. In response to a press operation of the touch pad 22 while bringing a fingertip in contact with one of the pseudo button areas 34a, 34b, then processing or display corresponding to the pseudo button area 34a, 34b is performed. For instance, the two pseudo button areas 34a and 34b correspond to the left button and the right button of a typical mouse, respectively.

As shown in FIG. 2, the touch pad 22 has a three-layered configuration, including a housing plate 40 as a bottom plate that is placed to be opposed to the base plate 26, a board plate (board) 42 that is stacked on the upper face of the housing plate 40 to detect a touch operation to the touch operation face 22a, and a pad plate (pad) 44 that is stacked on the board plate 42, whose surface is the touch operation face 22a to receive a touch operation. FIG. 3 omits the illustration of the board plate 42 and the pad plate 44.

The board plate 42 is a board having a rectangular shape in planar view, which is a sensor to detect a touch operation to the pad plate 44 or a press operation to the touch pad 22. The board plate 42 is connected to a board in the body chassis 14 via wiring not illustrated. To the board plate 42, not-illustrated wiring from the press buttons 24a to 24c is connected. The pad plate 44 is a glass plate or a resin plate having a rectangular shape in planar view, and is fixedly attached to the upper face of the board plate 42 with adhesive, double-faced tape, or the like. The board plate 42 is provided with ground line G on the lower face close the rear end, the ground line being a belt-like conductive plate that extends along the horizontal direction (see FIGS. 2 and 5).

As shown in FIGS. 2 and 3, the housing plate 40 is a resin plate having a rectangular shape in planar view, and is a chassis component to hold the board plate 42 and the pad plate 44. On the upper face of the housing plate 40, the board plate 42 is fixedly attached with adhesive, double-faced tape, or the like. The housing plate 40 has an inclined-face part 40a at the rear end and near the forward-end face of the press buttons 24a to 24c that is inclined downward to the rear side. Due to such an inclined-face part 40a, the touch pad 22 does not hinder the press operation of the press buttons 24a to 24c.

Figure 4:
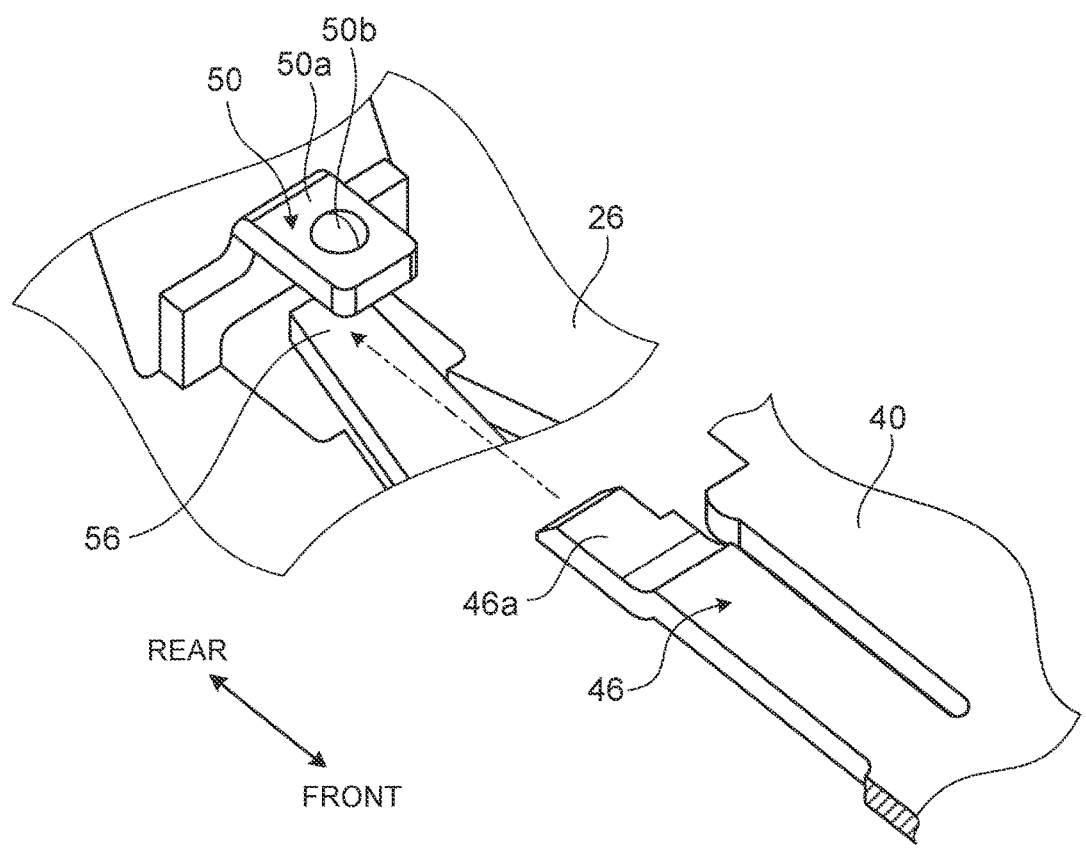
FIG. 4 is an enlarged perspective view of the major part of the input device shown in FIG. 3.
Figure 5:
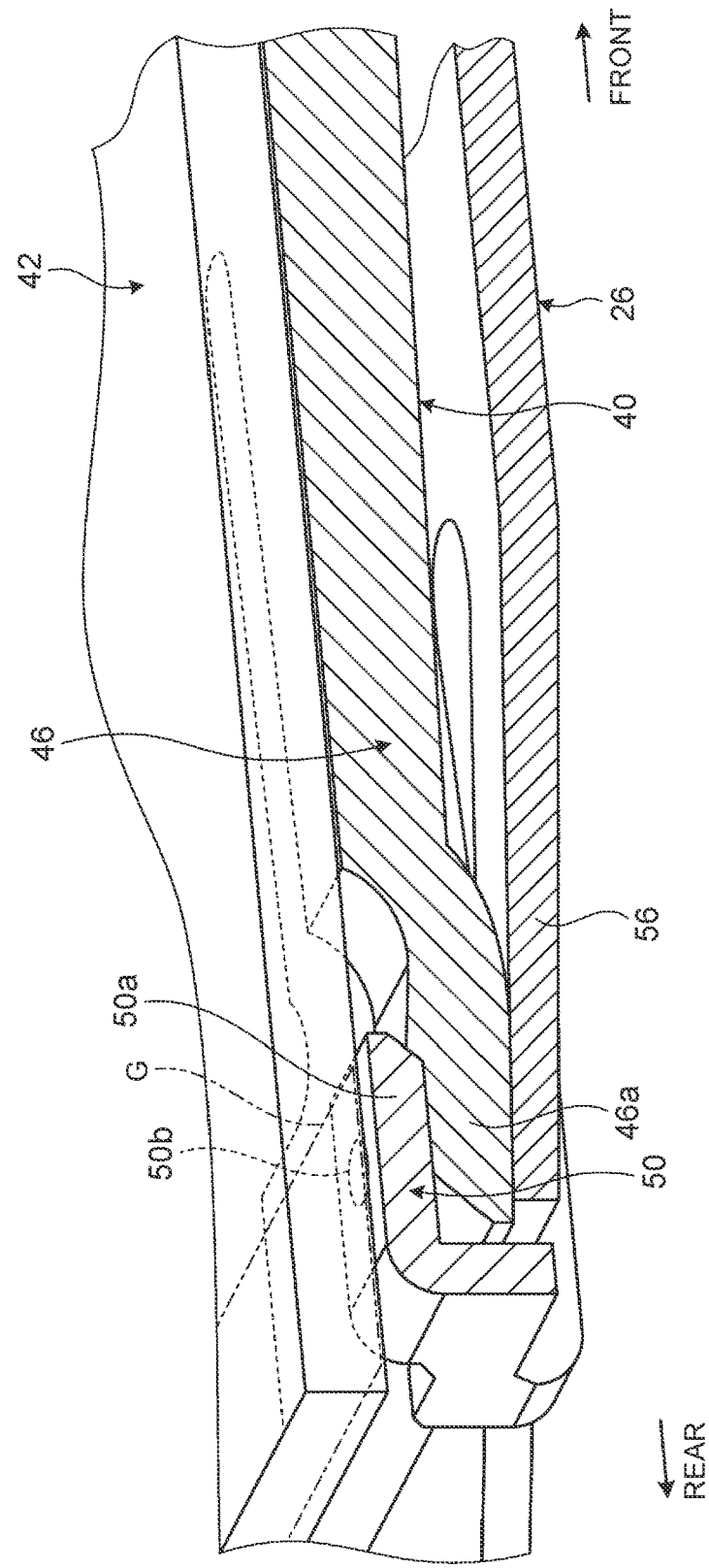
FIG. 5 is a perspective view showing a cross-section of the touch pad and the base plate to enlarge a part thereof close to the rear end.

FIG. 4 is an enlarged perspective view of the major part of the input device 10 shown in FIG. 3, showing the engagement structure of an elastic piece 46 provided at the housing plate 40 and a protruding piece 50 provided at the base plate 26. FIG. 5 is a perspective view showing a cross-section of the touch pad 22 and the base plate 26 to enlarge a part thereof close the rear end. FIG. 6 is a cross-sectional side view schematically showing the touch pad 22 and the base plate 26 to enlarge a part thereof close to the rear end, where FIG. 6(A) shows a state where the touch pad 22 is not pressed, and FIG. 6(B) shows a state where the touch pad 22 is pressed. In FIG. 5, for viewability of the drawing, the pad plate 44 and hatching of the board plate 42 are omitted.

As shown in FIGS. 3 to 5, a pair of left and right elastic pieces 46 is provided on the front side of the inclined-face part 40a of the housing plate 40 so as to be elongated toward the rear. The elastic pieces 46 are formed by cutting away their both left and right lateral parts and rear parts in the thickness direction so as to be a piece like a narrow tongue, whereby they have a cantilever structure to be elastic to some extent. Each elastic piece 46 has a nail 46a at the end (rear-end) so as to be displaced while being curved downward. The elastic pieces 46 are not fixedly attached to the lower face of the board plate 42, and at least the nails 46a are disposed to have a predetermined gap between the upper faces thereof and the board plate 42, whereby protruding pieces 50 that are formed by cutting the upper face of the base plate 26 so as to lift it up described later are sandwiched between the upper faces of the nails 46a and the lower face of the board plate 42.

Further, a set of (four in the present embodiment) engagement pieces 47 are provided on the front side of the inclined-face part 40a of the housing plate 40 so as to have a shape substantially similar to that of the nails 46a of the elastic pieces 46 and to be elongated short to the rear. Each of the engagement pieces 47 also engages with the corresponding protruding piece 50 that is cut to lift up from the base plate 26 (see FIGS. 2 and 3).

As shown in FIGS. 2 and 3, at a part close to the front end of the housing plate 40, a pair of left and right latches 52 is provided. Each latch 52 has a V-letter shape in planar view, which engages with a joint hook 54 formed on the upper face of the base plate 26 so as to stand like a L-letter shape in cross section. These latches 52 and joint hooks 54 are parts to join the housing plate 40 to the base plate 26 in their stacking direction as well as to restrict the ascending limit of the touch pad 22 while serving as a retainer to prevent it from coming off upward.

Since the elastic pieces 46 and the engagement pieces 47 of the housing plate 40 rotatably engage with the corresponding protruding pieces 50 of the base plate 26, the housing plate 40 (touch pad 22) can swing relative to the base plate 26 about these engaging portions as the supporting point. In the present embodiment, a not-illustrated guide structure vertically guides the housing plate 40 relative to the base plate 26, so that the housing plate 40 is configured to move vertically while moving the engagement portions of the elastic pieces 46 and the engagement pieces 47 with their corresponding protruding pieces 50 rearward and forward to some extent.

As shown in FIG. 2, a detection switch 55 is provided at a substantially center part on the lower face of the housing plate 40 close to the forward end. The detection switch 55 is to issue a predetermined detection signal when the touch pad 22 is pressed. The detection switch 55 is a metal dome switch, for example, that bulges downward from the lower face of the housing plate 40, which is turned on when the touch pad 22 is pressed until the switch comes into contact with the base plate 26, and this ON signal is detected by the board plate 42.

As shown in FIGS. 3 to 5, the protruding pieces 50 are formed to stand from the upper face of the base plate 26. Each protruding piece 50 is formed like an angular U-letter shape in lateral view that has an abutting plate 50a at the upper end that is bent toward the rear when a part of the base plate 26 is cut to lift upward. On the upper face of the abutting plate 50a of the protruding piece 50, a dome-like convex 50b is provided so as to bulge upward. The protruding pieces 50 are provided at the positions corresponding to the elastic pieces 46 and the engagement pieces 47 of the housing plate 40 (see FIG. 3). That is, in the present embodiment, a plurality of (six) protruding pieces 50 are disposed at a part of the base plate 26 close to the rear end along the horizontal direction.

Among these protruding pieces 50, below each of a pair of the protruding pieces 50, 50 corresponding to the pair of elastic pieces 46, an elastic pressing part 56 is disposed, which is formed on the upper face of the base plate 26. As shown in FIG. 4 and FIG. 5, similarly to the elastic pieces 46 of the housing plate 40, the elastic pressing parts 56 are formed by cutting away their both left and right lateral parts and rear parts in the thickness direction so as to be a piece like a narrow tongue, whereby they have a cantilever structure to be elongated rearward and be elastic to some extent. As shown in FIGS. 5 and 6, the ends of the elastic pressing parts 56 are located above the upper face of the base plate 26. That is, each of the elastic pressing parts 56 is a plate-spring like member that is bent upward from the upper face of the base plate 26, so as to press the elastic piece 46 against the lower face of the abutting plate 50a.

Therefore, as shown in FIGS. 5 and 6A, the input device 10 according to the present embodiment makes up a double sandwich structure at a part of the touch pad 22 and the base plate 26 close to the rear end such that the abutting plate 50a of the protruding piece 50 of the base plate 26 is sandwiched between the upper face of the nail 46a of the elastic piece 46 of the housing plate 40 and the lower face of the substrate plate 42, and then the nail 46a of the elastic piece 46 is sandwiched between the lower face of the abutting plate 50a and the upper face of the elastic pressing part 56. At this time, the top face of the convex 50b formed on the upper face of the abutting plate 50a of the protruding piece 50 of the base plate 26 comes into contact with the ground line (conductive plate) G provided on the lower face of the board plate 42. As a result, the touch pad 22 is supported in a swingable state above the base plate 26 about the part of the protruding pieces 50 of the base plate 26 sandwiched between the ground line G of the board plate 42 and the elastic pieces 46 of the housing plate 40 as the supporting point.

In the state where the touch pad 22 is not pressed, as shown in FIG. 6A, the above-stated double sandwich structure is made up between the touch pad 22 and the base plate 26. Thereby, the abutting plate 50a of the protruding piece 50 of the base plate 26 is sandwiched between the nail 46a of the elastic piece 46 of the housing plate 40 and the ground line G provided on the lower face of the board plate 42, meaning that the ground line G and the base plate 26 are electrically connected. This allows static electricity generated during the manipulation of the touch pad 22 to flow from the ground line G to the base plate 26 smoothly, so that the electricity can be discharged to the outside of the body chassis 14 of the electronic apparatus 12 via the base plate 26.

Next, when the touch pad 22 is pressed, as shown in FIG. 6B, the touch pad 22 swings while moving a part thereof close to the forward end downward above the base plate 26 about the part of the protruding pieces 50 of the base plate 26 sandwiched between the ground line G of the board plate 42 and the elastic pieces 46 of the housing plate 40 as the supporting point. Thereby, the detection switch 55 provided on the lower face of the housing plate 40 at a part close to the forward end is turned on because it is pressed by the upper face of the base plate 26.

During such a press operation of the touch pad 22 as well, the above-stated double sandwich structure is kept between the touch pad 22 and the base plate 26 (see FIG. 6B). That is, during the press operation of the touch pad 22 as well, the sandwiching state of the abutting plate 50a between the nail 46a of the elastic piece 46 and the ground line G is always kept, and therefore static electricity generated at the touch pad 22 can be discharged from the ground line G to the base plate 26 smoothly. Herein, since the dome-like convex 50b is provided on the upper face of the abutting plate 50a of the protruding piece 50, the contact state between the ground line G and the protruding piece 50 can be kept more reliably even when the touch pad 22 swings under the press operations.

As stated above, the input device 10 according to the present embodiment has a configuration such that the touch pad 22 as an operation-input part is movably supported above the metal base plate 26, the touch pad 22 including: the pad plate 44 to receive an input operation; the board plate 42 stacked below the pad plate 44 to detect an input operation to the pad plate 44; and the resin housing plate 40 stacked below the board plate 42, in which the upper face of the base plate 26 is provided with the protruding pieces 50 that are inserted between the board plate 42 and the housing plate 40 and come into contact with the ground line G as a conductive part provided at the board plate 42.

Therefore, the protruding pieces 50 of the metal base plate 26 come into contact with the ground line G of the board plate 42 while being sandwiched between the board plate 42 and the housing plate 40, irrespective of whether or not a press operation of the touch pad 22 is performed (see FIGS. 6A and 6B). This can eliminate the necessity to connect the ground line G of the board plate 42 and the metal base plate 26 with earth wire separately, and so can decrease the number of components and the number of steps in assembly process, and can decrease the cost. Additionally the ground line G and the protruding pieces 50 of the base plate 26 are always kept in contact and in an electrically connection state irrespective of whether or not a press operation of the touch pad 22 is performed, and so static electricity generated during the manipulation of the touch pad 22 is allowed to flow from the ground line G to the base plate 26 smoothly, so that the electricity can be discharged to the outside.

In other words, the touch pad 22 as the operation-input part of the input device 10 according to the present embodiment is supported swingably above the base plate 26, and the ground line G provided at the board plate 42 and the base plate 26 come into contact at the part as the supporting point of the swinging. Thereby, the ground line G and the base plate 26 can always come into contact and can keep their electrical connection state without adding a component such as earth wire separately and irrespective of whether or not a press operation of the touch pad 22 is performed.

In this input device 10, the housing plate 40 has the elastic pieces 46 that have a gap with the board plate 42, and some of the protruding pieces 50 are sandwiched between the ground line G of the board plate 42 and the elastic pieces 46 of the housing plate 40. Thereby, after engaging the elastic pieces 46 of the housing plate 40 with the protruding pieces 50 of the base plate 26, when the touch pad 22 is pressed for swinging, force generated at the bonding face between the board plate 42 and the housing plate 40 due to the influences of the thickness of the abutting plates 50a of the protruding pieces 50, their dimensional errors or the like can be absorbed by the elastic pieces 46. As a result, peeling-off at the bonding face between the board plate 42 and the housing plate 40 can be prevented.

In this input device 10, the base plate 26 has the elastic pressing parts 56 that have a gap with the protruding pieces 50, so as to sandwich the elastic pieces 46 of the housing plate 40 between the elastic pressing parts 56 and the protruding pieces 50 so that the elastic pressing parts 56 press the elastic pieces 46 against the protruding pieces 50. That is, since the nails 46a of the elastic pieces 46 of the housing plate 40 are sandwiched between the lower faces of the abutting plates 50a of the protruding pieces 50 and the elastic pressing parts 56, rattling of the elastic pieces 46 can be prevented when the touch pad 22 is pressed for swinging. As a result, the swinging motion of the touch pad 22 becomes more stable, and the electrical connection state between the ground line G and the base plate 26 can be kept more stably.

The present invention is not limited to the above-described embodiments, and can be freely changed without departing from the spirit of the present invention. For example, the above embodiment is configured so that the elastic pieces 46 are provided at the housing plate 40 and the elastic pressing parts 56 are provided at the base plate 26 so as to correspond to some of the protruding pieces 50 among the plurality of protruding pieces 50 provided at the base plate 26, and the other protruding pieces 50 engage with the engagement pieces 47 of the housing plate 40. In another embodiment, the elastic pieces 46 and the elastic pressing parts 56 may be disposed so as to correspond to all of the protruding pieces 50.

The present invention is applicable also to input devices other than a click pad including the touch pad 22 movably held above the base plate 26.

As has been described, the present disclosure provides an input device having sufficient countermeasure against static electricity.

While the disclosure has been particularly shown and described with reference to a preferred embodiment, it will be understood by those skilled in the art that various changes in form and detail may be made therein without departing from the spirit and scope of the disclosure.

What is claimed is:
1. An input device comprising:
a metal base plate; and
an operation-input part that is movably supported above said metal base plate, wherein said operation-input part includes
a touch pad to receive an input operation;
a board plate connected to said touch pad to detect said input operation on said touch pad, wherein said board plate includes a conductive plate;
a protruding piece having one end attached to a surface of said metal base plate;
a resin housing plate having a first end and a second end, wherein said first end is attached to said board plate, and said second end is disposed between said protruding piece and said metal base plate; and
an elastic piece located between said resin housing plate and said metal base plate, wherein said second end of said resin housing plate contacts an abutting plate of said protruding piece and said elastic piece.

2. The input device of claim 1, wherein said protruding piece is in an "L" shape.

3. The input device of claim 1, wherein a portion of said resin housing plate adjacent to said second end of said resin pressing part has a curve shape.

4. The input device of claim 1, wherein said protruding piece further includes a dome-like convex located on said abutting plate of said protruding piece for providing contact with said conductive plate of said board plate.

5. An electronic apparatus comprising:
a display;
a keyboard coupled to said display; and
an input device includes
a metal base plate; and
an operation-input part that is movably supported above said metal base plate, wherein said operation-input part includes
a touch pad to receive an input operation;
a board plate connected to said touch pad to detect said input operation on said touch pad, wherein said board plate includes a conductive plate;
a protruding piece having one end attached to a surface of said metal base plate;
a resin housing plate having a first end and a second end, wherein said first end is attached to said board plate, and said second end is disposed between said protruding piece and said metal base plate; and
an elastic piece located between said resin housing plate and said metal base plate, wherein said second end of said resin housing plate contacts an abutting plate of said protruding piece and said elastic piece.

6. The electronic apparatus of claim 5, wherein said protruding piece is in an "L" shape.

7. The electronic apparatus of claim 5, wherein a portion of said resin housing plate adjacent to said second end of said resin pressing part has a curve shape.

8. The electronic apparatus of claim 5, wherein said protruding piece further includes a dome-like convex located on said abutting plate of said protruding piece for providing contact with said conductive plate of said board plate.

* * * * *